United States Patent
Lewis (10) Patent No.: US 12,129,208 B2
(45) Date of Patent: Oct. 29, 2024

(54) GREEN CERAMIC BATCH MIXTURES COMPRISING AN INVERSE EMULSION AND METHODS FOR FORMING A CERAMIC BODY

(71) Applicant: CORNING INCORPORATED, Corning, NY (US)

(72) Inventor: Mark Alan Lewis, Horseheads, NY (US)

(73) Assignee: Corning Incorporated, Corning, NY (US)

(*) Notice: Subject to any disclaimer, the term of this patent is extended or adjusted under 35 U.S.C. 154(b) by 654 days.

(21) Appl. No.: 17/421,185

(22) PCT Filed: Jan. 7, 2020

(86) PCT No.: PCT/US2020/012477
§ 371 (c)(1),
(2) Date: Jul. 7, 2021

(87) PCT Pub. No.: WO2020/150039
PCT Pub. Date: Jul. 23, 2020

(65) Prior Publication Data
US 2022/0055949 A1 Feb. 24, 2022

Related U.S. Application Data

(60) Provisional application No. 62/792,049, filed on Jan. 14, 2019.

(51) Int. Cl.
| C04B 35/634 | (2006.01) |
| C04B 35/195 | (2006.01) |
| C04B 35/626 | (2006.01) |

(52) U.S. Cl.
CPC ........ *C04B 35/195* (2013.01); *C04B 35/6263* (2013.01); *C04B 35/6264* (2013.01);
(Continued)

(58) Field of Classification Search
None
See application file for complete search history.

(56) References Cited

U.S. PATENT DOCUMENTS

| 4,483,944 A | 11/1984 | Day et al. |
| 4,855,265 A | 8/1989 | Day et al. |

(Continued)

FOREIGN PATENT DOCUMENTS

| CN | 101880154 A | 11/2010 |
| JP | 5925433 B2 | 5/2016 |

(Continued)

OTHER PUBLICATIONS

International Search Report and Written Opinion of the International Searching Authority; PCT/US2020/012477; dated Mar. 31, 2020; 12 pages; European Patent Office.

*Primary Examiner* — Richard A. Huhn
(74) *Attorney, Agent, or Firm* — Matthew J. Mason (57) ABSTRACT

Green ceramic batch mixtures include: at least one inorganic batch component, preferably cordierite; at least one binder, preferably polyisoprene, poly(vinyl formal), poly(vinyl methyl ether), polybutadiene carboxy terminated; and an inverse emulsion having a continuous phase, an aqueous dispersed phase, and at least one emulsifier, preferably at least one functionalized silicone compound having at least one functional group chosen from a hydroxyl group, a carboxyl group, hydroxyl-terminated ethylene oxide groups.

18 Claims, 1 Drawing Sheet

(52) U.S. Cl.
CPC .... *C04B 35/63408* (2013.01); *C04B 35/6342* (2013.01); *C04B 35/63448* (2013.01); *C04B 2235/3481* (2013.01)

(56) References Cited

U.S. PATENT DOCUMENTS

| | | | |
|---|---|---|---|
| 5,082,607 A * | 1/1992 | Tange | ............... C04B 35/63404 264/44 |
| 5,290,739 A | 3/1994 | Hickman | |
| 6,620,751 B1 | 9/2003 | Ogunwumi | |
| 6,849,181 B2 | 2/2005 | Ogunwumi et al. | |
| 6,942,713 B2 | 9/2005 | Ogunwumi et al. | |
| 7,001,861 B2 | 2/2006 | Beall et al. | |
| 7,259,120 B2 | 8/2007 | Ellison et al. | |
| 7,294,164 B2 | 11/2007 | Merkel | |
| 7,704,296 B2 | 4/2010 | Merkel | |
| 2004/0020846 A1 | 2/2004 | Ogunwumi et al. | |
| 2004/0092381 A1 | 5/2004 | Beall et al. | |
| 2009/0220736 A1 | 9/2009 | Merkel | |

FOREIGN PATENT DOCUMENTS

| | | |
|---|---|---|
| JP | 5945965 B2 | 7/2016 |
| WO | 2004/011386 A1 | 2/2004 |
| WO | 2005/046840 A1 | 5/2005 |
| WO | 2006/015240 A2 | 2/2006 |
| WO | 2019/032645 A1 | 2/2019 |
| WO | 2019/125972 A1 | 6/2019 |

\* cited by examiner

GREEN CERAMIC BATCH MIXTURES COMPRISING AN INVERSE EMULSION AND METHODS FOR FORMING A CERAMIC BODY

This is a national stage application under 35 U.S.C. § 371 of International Application No. PCT/US2020/012477, filed on Jan. 7, 2020, which claims the benefit of priority under 35 U.S.C. § 119 of U.S. Provisional Application No. 62/792,049, filed on Jan. 14, 2019, the content of which is incorporated herein by reference in its entirety.

FIELD OF THE DISCLOSURE

The disclosure relates generally to green ceramic batch materials comprising at least one extrusion aid. More specifically, the disclosure relates to green ceramic batch mixtures comprising a water-in-oil emulsion and methods for extruding such batch mixtures to form a green ceramic body, which can be fired into a ceramic body.

BACKGROUND

Ceramic bodies, such as cordierite and aluminum titanate ceramics, may be used in a variety of applications. For example, ceramic bodies may be useful as filtration articles, e.g., catalytic converters and particulate filters, which can be utilized to remove pollutants and/or particulates from fluid streams. Exemplary fluid streams may comprise gases, vapors, or liquids, and the particulates may comprise a separate phase in the fluid, such as solid particulates in a gas or liquid stream, or droplets of liquid in a gas stream, and the like. Particulates can include soot, ash, dust, aerosolized liquids, and any other variety of particulate contaminant present in any given fluid. Pollutants can include toxic gases or liquids, e.g., carbon monoxide, unburned hydrocarbon fuel, and the like.

SUMMARY

In some embodiments, a green ceramic batch mixture comprises: at least one inorganic batch component; at least one binder; and an inverse emulsion comprising a continuous phase, an aqueous dispersed phase, and at least one emulsifier.

In one aspect, which is combinable with any of the other aspects or embodiments, the at least one inorganic batch component comprises a cordierite-forming powder.

In one aspect, which is combinable with any of the other aspects or embodiments, the at least one inorganic batch component comprises at least one source of alumina, silica, magnesia, titania, lanthanum oxide, yttrium oxide, barium oxide, sodium oxide, potassium oxide, lithium oxide, calcium oxide, strontium oxide, iron oxide, boron oxide, phosphorous oxide, calcium carbonate, calcium nitrate, calcium hydroxide, strontium carbonate, strontium nitrate, or strontium hydroxide.

In one aspect, which is combinable with any of the other aspects or embodiments, the at least one binder comprises at least one water-soluble binder, at least one oil-soluble binder, or combinations thereof.

In one aspect, which is combinable with any of the other aspects or embodiments, the at least one binder comprises at least one oil-soluble binder.

In one aspect, which is combinable with any of the other aspects or embodiments, the at least one oil-soluble binder comprises at least one of polyisoprene, poly(vinyl formal), poly(vinyl methyl ether), polybutadiene carboxy terminated, or combinations thereof.

In one aspect, which is combinable with any of the other aspects or embodiments, the at least one binder is present in the green ceramic batch mixture in a range of 1 wt. % to 10 wt. %, relative to the total weight of the batch mixture.

In one aspect, which is combinable with any of the other aspects or embodiments, the at least one binder is uniformly disposed in the continuous phase.

In one aspect, which is combinable with any of the other aspects or embodiments, the continuous phase with the uniformly disposed at least one binder has a first viscosity; the continuous phase without the at least one binder has a second viscosity; and the first viscosity is greater than the second viscosity.

In one aspect, which is combinable with any of the other aspects or embodiments, the at least one binder is configured for stabilizing the aqueous dispersed phase by increasing viscosity of the continuous phase.

In one aspect, which is combinable with any of the other aspects or embodiments, the aqueous dispersed phase is a plurality of micro-droplets having a diameter below about 10 µm.

In one aspect, which is combinable with any of the other aspects or embodiments, the continuous phase comprises at least one oil.

In one aspect, which is combinable with any of the other aspects or embodiments, the at least one oil comprises mineral oil, poly alpha-olefin oil, and combinations thereof.

In one aspect, which is combinable with any of the other aspects or embodiments, the at least one emulsifier comprises: at least one functionalized silicone compound having at least one functional group chosen from a hydroxyl group, a carboxyl group, hydroxyl-terminated ethylene oxide groups, and combinations thereof.

In one aspect, which is combinable with any of the other aspects or embodiments, the at least one functionalized silicone compound comprises a functionalized siloxane.

In one aspect, which is combinable with any of the other aspects or embodiments, the batch mixture further comprises: at least one auxiliary emulsifier chosen from fatty acids, surfactants, and combinations thereof.

In one aspect, which is combinable with any of the other aspects or embodiments, the at least one emulsifier is present in the green ceramic batch mixture in a range of 0.1 wt. % to 3 wt. %, relative to the total weight of the batch mixture.

In one aspect, which is combinable with any of the other aspects or embodiments, the aqueous dispersed phase is present in the inverse emulsion in an amount ranging from about 75% to about 95% by weight based on the total weight of the inverse emulsion.

In one aspect, which is combinable with any of the other aspects or embodiments, the batch mixture further comprises: at least one of: cordierite, aluminum titanate, silicon carbide, silicon nitride, calcium aluminate, zirconium phosphate, eucryptite, spodumene, mullite, or feldspar.

In one aspect, which is combinable with any of the other aspects or embodiments, a green ceramic body comprises a batch mixture disclosed herein.

In one aspect, which is combinable with any of the other aspects or embodiments, the green ceramic body disclosed herein has an elastic modulus, $E_o$, in a range of 60 to 200.

Additional features and advantages of the disclosure will be set forth in the detailed description which follows, and in part will be readily apparent to those skilled in the art from that description or recognized by practicing the methods as described herein, including the detailed description which follows, the claims, as well as the appended drawings.

It is to be understood that both the foregoing general description and the following detailed description present various embodiments of the disclosure, and are intended to provide an overview or framework for understanding the nature and character of the claims. The accompanying drawings are included to provide a further understanding of the disclosure, and are incorporated into and constitute a part of this specification. The drawings illustrate various embodiments of the disclosure and, together with the description, serve to explain the principles and operations of the disclosure.

BRIEF DESCRIPTION OF THE DRAWINGS

The following detailed description can be further understood when read in conjunction with the following drawings in which.

DETAILED DESCRIPTION

Figure 1A:
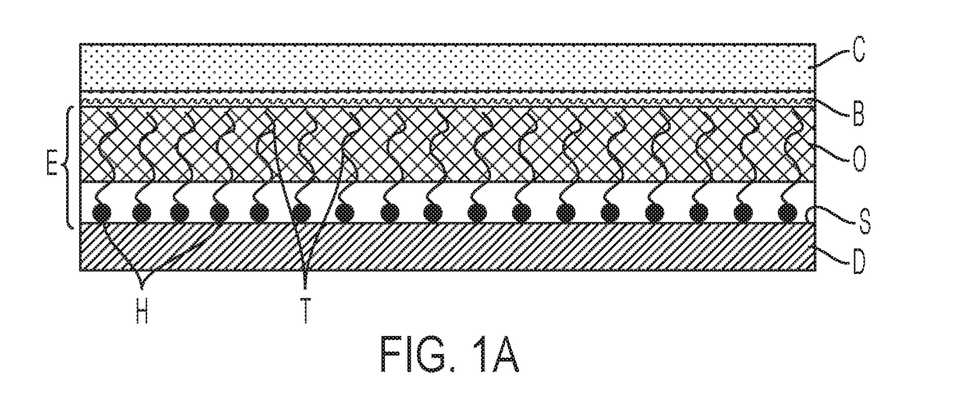
FIGS. 1A-B illustrate different lubrication mechanisms for green ceramic batch mixtures in an extrusion apparatus.
Figure 1B:
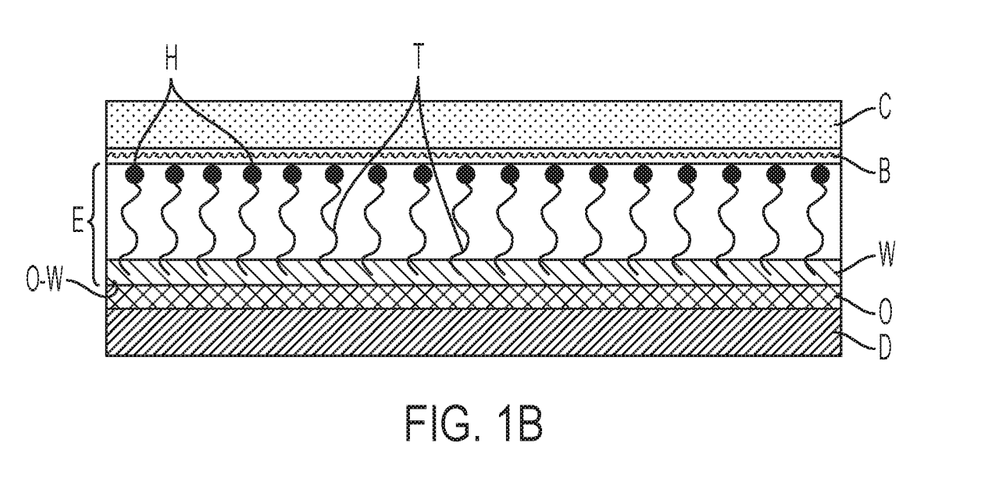

Referring to FIG. 1A, conventional theories pertaining to the lubrication mechanism for green ceramic batch mixtures in an extrusion apparatus hypothesize the migration of the emulsifier E from the green ceramic batch mixture C to the wall surface S such that the polar head group H of the emulsifier E attaches to the internal surface S of the extrusion apparatus D and the hydrophobic tail T interacts with the green ceramic batch mixture C and binder B via the oil phase O. However, it has now been surprisingly discovered that the lubrication mechanism instead involves interaction of the emulsifier E with the binder B at the oil-water O-W interface, as illustrated in FIG. 1B. Without wishing to be bound by theory, in light of this new understanding of the lubrication dynamic, it is believed that improved lubrication may be achieved by incorporating a water-in-oil ("inverse") emulsion in the green ceramic batch mixture, e.g., such that the oil is the continuous phase and the water is the dispersed phase. For example, the dispersed phase, in a stabilized emulsion, may be present as micro-droplets in the continuous phase.

Disclosed herein are green ceramic batch mixtures comprising at least one inorganic batch component and an inverse emulsion comprising at least one lubricant (i.e., "continuous phase"), at least one aqueous solvent (i.e., "dispersed phase"), at least one binder, and at least one functionalized silicone compound.

As used herein, the term "green ceramic batch mixture" and variations thereof is intended to denote a mixture comprising inorganic batch components capable of being formed into a green ceramic body, which can then be fired into a ceramic body, wherein the green ceramic batch mixture comprises one or more ceramic components, and/or one or more components which are capable of forming a ceramic phase or ceramic material. The batch mixture can comprise a mixture of inorganic batch components and additional components, such as a binder, water, oil, and/or any other desired additive. In some embodiments, the mixture is substantially homogeneous. Green ceramic batch-forming materials may have any suitable composition, e.g., as desired for a filtration application or any other application. Exemplary ceramic compositions include, but are not limited to, cordierite, aluminum titanate, silicon carbide, silicon nitride, calcium aluminate, zirconium phosphate, eucryptite, spodumene, mullite, feldspar, and the like. As such, in some embodiments, the green ceramic batch mixture is a cordierite-forming batch mixture, an aluminum-titanate-forming batch mixture, and so forth, without limitation. According to certain embodiments, the inorganic batch components are in the form of a reactive powder.

Inorganic Batch Components

Inorganic batch components making up the green ceramic batch mixture can comprise one or more inorganic oxides or precursors thereof, collectively referred to herein as "source" materials. Sources include, but are not limited to, materials that, when heated to a given temperature, alone or in the presence of other materials, will yield an inorganic oxide. In various non-limiting embodiments of the disclosure, inorganic batch components comprise at least one source of alumina, silica, magnesia, titania, and/or other inorganic oxides (e.g., lanthanum, yttrium, barium, sodium, potassium, lithium, calcium, strontium, iron, boron, and phosphorous oxides), as well as other inorganic compounds such as carbonates, nitrates, and hydroxides (e.g., calcium and strontium carbonate).

Exemplary sources of alumina include, but are not limited to, alpha-alumina, transition aluminas such as gamma, theta, chi, and rho aluminas, hydrated alumina, gibbsite, corundum, boehmite, pseudoboehmite, aluminum hydroxide, aluminum oxyhydroxide, diaspore, kaolin, and combinations thereof. In various embodiments, the alumina source is present in the green ceramic batch mixture in an amount ranging from about 25% to about 60% by weight, on an oxide basis, relative to the total weight of inorganic batch components. For example, the alumina source can comprise from about 30% to about 55%, from about 35% to about 50%, or from about 40% to about 45% by weight of the inorganic batch components, including all ranges and subranges therebetween.

Non-limiting examples of silica sources comprise non-crystalline silica, such as fused silica and sol-gel silica, crystalline silica such as zeolite, quartz, and cristobalite, colloidal silica, diatomaceous silica, silicone resin, diatomaceous silica, kaolin, talc, mullite, and combinations thereof. In other embodiments, the silica source is chosen from silica-forming sources comprising at least one compound that forms silica when heated, such as, for example, silicic acid and silicone organometallic compounds. According to exemplary embodiments, the silica source is present in the green ceramic batch mixture in an amount ranging from about 5% to about 60% by weight on an oxide basis, such as from about 8% to about 50%, from about 10% to about 40%, from about 12% to about 30%, or from about 15% to about 20% by weight on an oxide basis, relative to the total weight of the inorganic batch components, including all ranges and subranges therebetween.

Exemplary titania sources include, but are not limited to, rutile, anatase, amorphous titania, and combinations thereof. The titania source can be present in the green ceramic batch mixture in an amount ranging from about 25% to about 40% by weight on an oxide basis, such as from about 27% to about 35%, or from about 30% to about 33% by weight on an oxide basis, relative to the total weight of the inorganic batch components, including all ranges and subranges therebetween.

Non-limiting examples of magnesia sources comprise talc, magnesite, magnesium hydroxide, and combinations thereof. The magnesia source can be present in the green ceramic batch mixture in an amount ranging from about 5% to about 25% by weight on an oxide basis, such as from about 10% to about 20%, from about 12% to about 17%, or from about 14% to about 16% by weight on an oxide basis, relative to the total weight of the inorganic batch components, including all ranges and subranges therebetween.

The green ceramic batch mixture, in some embodiments, further comprises at least one additional inorganic oxide, carbonate, nitrate, or hydroxide, such as lanthanum, yttrium, barium, sodium, potassium, lithium, calcium, strontium, iron, boron, and phosphorous oxides, carbonates, nitrates, and/or hydroxides. According to various embodiments, such additional components are present in the green ceramic batch mixture in an amount ranging from about 3% to 50% by weight on an oxide basis, such as from about 5% to about 40%, from about 8% to about 30%, from about 10% to about 20%, or from about 12% to about 15% by weight on an oxide basis, relative to the total weight of the inorganic batch components, including all ranges and subranges therebetween. One or more multi-source inorganic compounds can also be included in the green ceramic batch mixture, e.g., a compound comprising more than one type of oxide or precursor thereof, such as kaolin.

In various embodiments, the inorganic batch components are chosen such that the green ceramic batch mixture forms and/or comprises cordierite, aluminum titanate, silicon carbide, silicon nitride, calcium aluminate, zirconium phosphate, eucryptite, spodumene, mullite, and feldspar ceramic bodies. Thus, one or more inorganic components can have the same composition as the final fired composition, for example an inorganic component can be silicon carbide wherein silicon carbide particles bond, agglomerate, or sinter to one another resulting in a silicon carbide final ceramic body; or, one of the inorganic components can be cordierite wherein the final fired ceramic article comprises cordierite. Instead, or in addition, the inorganic components can comprise two or more inorganic components which react with each other in a solid phase reaction to result in a final fired composition which is different from either of the inorganic components, for example alumina and silica can be provided as inorganic components and the final fired ceramic composition can be cordierite or aluminum titanate or other composition. In at least one embodiment, the green ceramic batch mixture forms an aluminum titanate ceramic body. For instance, the stoichiometry of the inorganic batch components can be chosen to produce a ceramic composition comprising about 45-55 wt % alumina, about 25-35 wt % titania, and about 5-15 wt % silica. Exemplary aluminum titanate batch mixtures and the preparation thereof are described in U.S. Pat. Nos. 4,483,944, 4,855,265, 5,290,739, 6,620,751, 6,942,713, 6,849,181, 7,001,861, 7,259,120, and 7,294,164; U.S. Patent Application Publication Nos. 2004/0020846 and 2004/0092381; and International Patent Application Publication Nos. WO 2006/015240, WO 2005/046840, and WO 2004/011386, all of which are incorporated herein by reference in their entireties.

According to certain embodiments, the green ceramic batch mixture forms a cordierite-forming green ceramic body, which is then be fired into a cordierite ceramic body. For instance, the stoichiometry of the inorganic batch components can be chosen to produce a ceramic composition comprising about 35-60 wt % silica, about 25-50 wt % alumina, and about 5-25 wt % magnesia. Exemplary cordierite batch mixtures and the preparation thereof are described in U.S. Pat. No. 7,704,296 and U.S. Patent Application Publication No. 2009/0220736, both of which are incorporated herein by reference in their entireties. The cordierite green ceramic composition can, in various exemplary embodiments, comprise clay or, in other embodiments, be substantially free of clay. For example, the cordierite batch mixtures can comprise less than about 1% by weight of clay, for example, less than about 0.5% by weight of clay, or less than about 0.1% by weight of clay.

Continuous Phase

In various embodiments, the green ceramic batch mixtures further comprise a continuous phase having at least one lubricant. For example, the green ceramic batch mixture can comprise at least one of mineral oil, corn oil, high molecular weight polybutenes, polyol esters, paraffin wax, and combinations thereof. In various embodiments, the at least one lubricant comprises a mineral or poly alpha-olefin oil. Commercially available lubricants can include, but are not limited to, Durasyn® products sold by Ineos, e.g., Durasyn® 162, and NEXBASE® 3020 sold by Neste. The at least one lubricant can be present in the green ceramic batch mixture in an amount ranging from about 1% to about 10% by weight, such as from about 2% to about 9%, from about 3% to about 8%, from about 4% to about 7%, or from about 5% to about 6% by weight, as super addition relative to the total weight of the inorganic batch components in the batch mixture, including all ranges and subranges therebetween. In certain embodiments, the at least one lubricant is present in the green ceramic batch mixture in an amount ranging from about 2% to about 5% by weight, relative to the total weight of inorganic batch components in the batch mixture. That is, weight percentages are expressed herein as parts per hundred inorganic (pphi), which excludes the weight of the binder, liquid vehicle, extrusion aids, and additives. The weight percentages of the non-inorganic components, such as the binder, liquid vehicle, extrusion aid, and additives, are given as super additions with respect to the total weight of inorganic batch components in the batch mixture.

Dispersed Phase

In various embodiments, the green ceramic batch mixtures further comprise a dispersed phase having at least one aqueous solvent (e.g., water-based). For example, the aqueous solvent can comprise water alone or mixtures of water and at least one water-miscible solvent, e.g., alcohols. In at least one embodiment, the aqueous solvent consists essentially of water, such as deionized water. In various non-limiting embodiments, the at least one aqueous solvent can be present in the green ceramic batch mixture in an amount ranging from about 15% to about 50% by weight, such as from about 20% to about 45%, from about 25% to about 40%, or from about 30% to about 35% by weight, relative to the total weight of inorganic batch components in the the batch mixture, including all ranges and subranges therebetween. According to certain embodiments, the at least one aqueous solvent can be present in the green ceramic batch mixture in an amount ranging from about 25% to about 40% by weight, relative to the total weight of the inorganic batch components in the batch mixture.

Binder

In various embodiments, the green ceramic batch mixtures further comprise at least one binder. In some examples, the at least one binder can comprise at least one water-soluble binder. By way of non-limiting example, the water-soluble binder can comprise cellulosic binders such as methylcellulose, hydroxypropyl methylcellulose, methylcel- lulose derivatives, and combinations thereof. Commercially available cellulose binders include, but are not limited to, Methocel binders sold by Dow Chemical.

In some examples, the at least one binder comprises a continuous phase-soluble binder (i.e., "oil-soluble binder"). By way of non-limiting example, the oil-soluble binder can comprise structures as shown in Table 1. In some examples, the oil-soluble binder can be a non-reactive material (e.g., polyisoprene, poly(vinyl formal), poly(vinyl methyl ether), etc.), a reactive material (e.g., polybutadiene carboxy terminated, etc.), or combinations thereof. In some examples, the oil-soluble binder (e.g., siloxane polymers) forms a chemical synergy with functionalized siloxane additives. In other words, a thermal transition or chemical transition would allow the physical state of the material to maintain the shape of the formed parts.

In some examples, the at least one binder comprises at least one water-soluble binder, at least one oil-soluble binder, or combinations thereof. In certain embodiments, the at least one binder is present in the green ceramic batch mixture in an amount ranging from about 1% to about 10% by weight, for example, from about 2% to about 6%, or about 3% to about 5%, by weight, relative to the total weight of the inorganic batch components in the batch mixture.

Emulsifier

In various embodiments, the green ceramic batch mixtures further comprise at least one emulsifier. Exemplary emulsifiers comprise functionalized silicone compounds, such as functionalized siloxanes. Exemplary functional groups can include, but are not limited to, hydroxyl (OH), carboxyl (COON), and hydroxyl-terminated ethylene oxide $(EO)_p OH$ groups, or combinations thereof. For instance, the functionalized silicone compound can be chosen from compounds of formula (I):

(I)

wherein n can range from 1 to 70, such as from 2 to 60, from 3 to 50, from 4 to 40, from 5 to 30, from 6 to 20, from 7 to 10, or from 8 to 9, including all ranges and subranges therebetween, and wherein X is a functional group, e.g., a

TABLE 1

| Name | Structure |
|---|---|
| Polyisoprene | |
| Poly(vinyl formal) | |
| Poly(vinyl methyl ether) | |
| Polybutadiene carboxy terminated | |

In some examples, the oil-soluble binders are uniformly disposed in the continuous phase and have a viscosity greater than the viscosity of a continuous phase without the oil-soluble binders. In these instances, the oil-soluble binders as disclosed herein, may function as stabilizers for the dispersed phase aqueous solvent by increasing the viscosity of the continuous phase to thereby mitigate, or retard, the mobility of the dispersed phase (e.g., micro-droplets) through continuous phase which leads to unwanted dispersed phase re-agglomeration. In other words, by inclusion of the oil-soluble binder, the micro-droplet dispersed phase is maintained at a diameter below approximately 10 μm. At diameters above approximately 10 μm, the micro-droplets are much more likely to agglomerate and form a second continuous phase rather than remain as a dispersed phase.

hydroxyl group, a carboxyl group, or a hydroxyl-terminated ethylene oxide group. While the compounds of formula (I) are illustrated as bidentate compounds, it is also possible to utilize monodentate silicone compounds, e.g., compounds substituted with only one functional group X. Exemplary functionalized siloxane compounds can comprise compounds of formulae (II)-(IV):

(II)

-continued (III)

(IV)

wherein n is as defined above, m ranges from 1 to 15, such as from 2 to 12, from 3 to 10, from 4 to 9, from 5 to 8, or from 6 to 7, including all ranges and subranges therebetween, and p ranges from 1 to 4, such as from 2 to 3, including all ranges and subranges therebetween. Monodentate silicone compounds comprising the functional groups depicted in formulae (II)-(IV) can also be used in some embodiments.

According to various embodiments, functional group X comprises a hydrocarbon chain and at least one hydroxyl group. The hydrocarbon chain can, in non-limiting embodiments, comprise 15 carbon atoms or less, such as $C_1$-$C_{15}$ carbon chains, $C_2$-$C_{12}$ carbon chains, $C_3$-$C_{10}$ carbon chains, $C_4$-$C_9$ carbon chains, $C_5$-$C_8$ carbon chains, or $C_6$-$C_7$ carbon chains. The hydrocarbon chain can be saturated or unsaturated, linear, branched, or cyclic, and/or unsubstituted or substituted with at least one heteroatom, such as N, O, or S. The at least one functionalized silicone compound can be present in the green ceramic batch mixture in an amount ranging from about 0.05% to about 3% by weight, such as from about 0.1% to about 2.5%, from about 0.5% to about 2%, or from about 1% to about 1.5% by weight, relative to the total weight of inorganic batch components in the batch mixture, including all ranges and subranges therebetween. In some embodiments, the at least one functionalized silicone compound is present in the green ceramic batch mixture in an amount ranging from about 0.1% to about 0.8% by weight, relative to the total weight of the inorganic batch components in the batch mixture.

Extrusion Aids

Extrusion aids can include oils, such as paraffin oils, which can be combined with one or more emulsifiers, such as fatty acids, which are believed to provide a "slip" layer between the green ceramic batch mixture and the extrusion equipment walls. Extrusion aids may reduce pressure within the extrusion equipment and allow for a higher feed rate and/or extrusion rate to increase production. The functionalized silicone emulsifiers disclosed herein may have one or more benefits as compared to traditional fatty acids and/or surfactants. Fatty acid emulsifiers often comprise a long hydrophobic carbon chain that may produce one or more problematic exotherms due to organic combustion when the green ceramic body is subsequently fired and/or these organic additives may undesirably volatilize during drying of the green ceramic body. The functionalized silicones disclosed herein may not volatilize during drying of the green ceramic body and/or may not produce a large exotherm due to organic combustion upon firing of the green ceramic body. Additionally, the functionalized silicone may serve as a bimodal additive, e.g., serving two purposes, first as an emulsifier and second as an inorganic source material upon its conversion to silica during firing of the green ceramic body.

The lubricant (continuous phase), aqueous solvent (dispersed phase), at least one binder, and functionalized silicone compound (emulsifier) can, in various embodiments, be present in the green ceramic batch mixture in the form of an inverse (water-in-oil) emulsion. As such, the relative amounts of each of these components on a weight basis relative to the total weight of the inverse emulsion may vary. Relative amounts within the inverse emulsion are calculated based on the assumption that each of the continuous phase, dispersed phase, binder, and emulsifier components fully (100%) participate in the inverse emulsion, but that portions of each of these components can be present outside of the emulsion, e.g., intermixed with the inorganic batch components and/or the binder, or any other component present in the batch mixture.

The at least one lubricant can be present in the inverse emulsion in an amount ranging from about 3% to about 30% by weight, such as from about 4% to about 25%, from about 5% to about 20%, or from about 10% to about 15% by weight, relative to the total weight of the inverse emulsion, including all ranges and subranges therebetween. The at least one aqueous solvent can be present in the inverse emulsion in an amount of at least about 75%, such as ranging from about 75% to about 95% by weight, from about 80% to about 92%, from about 82% to about 90%, or from about 85% to about 88% by weight, relative to the total weight of the inverse emulsion, including all ranges and subranges therebetween. The at least one functionalized silicone compound can be present in the inverse emulsion in an amount ranging from about 0.1% to about 10% by weight, such as from about 0.2% to about 9%, from about 0.3% to about 8%, from about 0.5% to about 7%, from about 1% to about 6%, from about 2% to about 5%, or from about 3% to about 4% by weight, relative to the total weight of the inverse emulsion, including all ranges and subranges therebetween. In certain embodiments, the at least one lubricant can be present in the inverse emulsion in an amount ranging from about 4% to about 12% by weight, the at least one aqueous solvent can be present in the inverse emulsion in an amount ranging from about 80% to about 90% by weight, and the at least one functionalized silicone compound can be present in the inverse emulsion in an amount ranging from about 0.2% to about 4% by weight, relative to the total weight of the inverse emulsion.

Additives

The green ceramic batch mixture can optionally comprise at least one additive, such as auxiliary emulsifiers, pore formers, and the like. Exemplary auxiliary emulsifiers can comprise fatty acids, surfactants, and other like compounds. Fatty acids can comprise saturated and unsaturated, linear and branched fatty acids, such as $C_8$-$C_{22}$ fatty acids and derivatives thereof, e.g., stearic acid, lauric acid, oleic acid, linoleic acid, and palmitoleic acid. Other exemplary fatty acids comprise tall oil, olean white, palmitic acid, and mixtures of fatty acids, such as mixtures comprising lauric acid, mixtures comprising oleic acid, and mixtures comprising stearic acid, such as Emersol® 213 (E213) and Emersol® 120 (E120). Mixtures of fatty acids and esters are used in some embodiments. The at least one fatty acid can be present in the green ceramic batch mixture in an amount ranging from about 0.1% to about 3% by weight, such as from about 0.3% to about 2.5%, from about 0.5% to about 2% by weight, or from about 1% to about 1.5% by weight, relative to the total weight of the inorganic batch components in the batch mixture, including all ranges and subranges therebetween. In certain embodiments, the at least one fatty acid can be present in the green ceramic batch mixture in an amount ranging from about 0.1% to about 1% by weight, relative to the total weight of the inorganic batch components in the batch mixture.

Non-limiting examples of surfactants comprise $C_8$-$C_{22}$ fatty alcohols, sulfates, esters, ethers, ethylene oxides, and combinations thereof. In certain embodiments, the at least one surfactant can be chosen from ammonium lauryl sulfate, polyethylene glycol alkyl ethers, sorbitan esters, ethoxylated sorbitan esters, polysorbates, ethylene oxides, and combinations thereof. According to non-limiting embodiments, the at least one surfactant can be chosen from non-ionic surfactants. Commercially available surfactants include, but are not limited to, Brij®, Span®, and Tween surfactants, e.g., Brij® 30, 35, 93, 97, and 98; Span® 20, 40, 60, 80, 83, 85, and 120; and Tween 20, 21, 40, 60, 61, 65, and 80. The at least one surfactant can be present in the green ceramic batch mixture in an amount ranging from about 0.05% to about 3% by weight, such as from about 0.1% to about 2.5%, from about 0.5% to about 2%, or from about 1% to about 1.5% by weight, relative to the total weight of the inorganic batch components in the batch mixture, including all ranges and subranges therebetween. In certain embodiments, the at least one surfactant can be present in the green ceramic batch mixture in an amount ranging from about 0.1% to about 0.8% by weight, relative to the total weight of the inorganic batch components in the batch mixture.

Exemplary pore formers comprise, for instance, any particulate substance that burns out of the ceramic green body during firing to create pores in the fired ceramic body. Examples of pore formers include, but are not limited to, carbon pore formers, such as graphite, activated carbon, petroleum coke, and carbon black; starch pore formers, such as corn, barley, bean, potato rice, tapioca, pea, sago palm, wheat, canna, and walnut shell flours; polymer pore formers, such as polybutylene, polymethylpentene, polyethylene, polypropylene, polystyrene, polyamides (nylons), epoxies, ABS, acrylics, and polyesters (PET); and combinations thereof. According to at least one embodiment, the at least one pore former is chosen from carbon pore formers such as graphite and starch pore formers such as rice corn, sago palm, and potato. In various non-limiting embodiments, the at least one pore former can be present in the green ceramic batch mixture in an amount ranging from about 1% to about 40% by weight, for example, from about 5% to about 30%, from about 10% to about 25%, or from about 15% to about 20% by weight, relative to the total weight of the inorganic batch components in the batch mixture, including all ranges and subranges therebetween. In certain embodiments, the green ceramic batch mixture can comprise two or more types of pore formers, such as three or more pore formers. For example, a combination of polymer and carbon pore formers, a combination of carbon and starch pore formers, or a combination of polymer and starch pore formers can be used, without limitation.

Also disclosed herein are green ceramic batch mixtures comprising at least one inorganic batch component and an inverse emulsion comprising at least one lubricant, at least one binder, at least one emulsifier, and at least 75% by weight of at least one aqueous solvent. The emulsifier is, in some embodiments, chosen from one or more of the functionalized silicone compounds disclosed herein. In other embodiments, the emulsifier is chosen from the auxiliary emulsifiers disclosed herein, such as fatty acids, surfactants, and mixtures thereof. Mixtures of functionalized silicone compounds, fatty acids, and/or surfactants can also be used in some embodiments.

According to non-limiting embodiments, the at least one lubricant can be present in the green ceramic batch mixture in an amount ranging from about 1% to about 10% by weight, such as from about 2% to about 9%, from about 3% to about 8%, from about 4% to about 7%, or from about 5% to about 6% by weight, relative to the total weight of the inorganic batch components in the batch mixture, including all ranges and subranges therebetween. In additional embodiments, the aqueous solvent can be present in the green ceramic batch mixture in an amount ranging from about 15% to about 50% by weight, such as from about 20% to about 45%, from about 25% to about 40%, or from about 30% to about 35% by weight, relative to the total weight of the inorganic batch components in the batch mixture, including all ranges and subranges therebetween. According to further embodiments, the at least one emulsifier can be present in the green ceramic batch mixture in an amount ranging from about 0.05% to about 3% by weight, such as from about 0.1% to about 2.5%, from about 0.5% to about 2%, or from about 1% to about 1.5% by weight, relative to the total weight of the inorganic batch components in the batch mixture, including all ranges and subranges therebetween. In certain embodiments, the at least one lubricant can be present in the green ceramic batch mixture in an amount ranging from about 2% to about 5% by weight, the at least one aqueous solvent can be present in the green ceramic batch mixture in an amount ranging from about 25% to about 40% by weight, and the at least one emulsifier can be present in the green ceramic batch mixture in an amount ranging from about 0.1% to about 0.8% by weight, relative to the total weight of the inorganic batch components in the batch mixture.

In still further embodiments, the at least one lubricant can be present in the inverse emulsion in an amount ranging from about 3% to about 30% by weight, such as from about 4% to about 25%, from about 5% to about 20%, or from about 10% to about 15% by weight, relative to the total weight of the inverse emulsion, including all ranges and subranges therebetween. According to certain embodiments, the at least one aqueous solvent can be present in the inverse emulsion in an amount of at least about 75%, such as ranging from about 75% to about 95% by weight, from about 80% to about 92%, from about 82% to about 90%, or from about 85% to about 88% by weight, relative to the total weight of the inverse emulsion, including all ranges and subranges therebetween. In various embodiments, the at least one emulsifier can be present in the inverse emulsion in an amount ranging from about 0.1% to about 10% by weight, such as from about 0.5% to about 9%, from about 1% to about 8%, from about 2% to about 7%, from about 3% to about 6%, or from about 4% to about 5%, including all ranges and subranges therebetween. In certain embodiments, the at least one lubricant can be present in the inverse emulsion in an amount ranging from about 4% to about 12% by weight, the at least one aqueous solvent can be present in the inverse emulsion in an amount ranging from about 80% to about 90%, and the at least one emulsifier can be present in the inverse emulsion in an amount ranging from about 0.2% to about 4% by weight, relative to the total weight of the inverse emulsion.

According to non-limiting embodiments, the inverse emulsion can comprise a relatively high aqueous fraction, such as at least about 75% or more by weight of at least one aqueous solvent, e.g., water. The aqueous fraction can be adjusted by the type and/or amount of emulsifier used. The aqueous fraction can also be adjusted by one or more process parameters, such as extrusion temperature, pressure, and the like. Without wishing to be bound by theory, it is believed that a large aqueous fraction may advantageously solubilize the binder and result in a more effective lubrication mechanism. By selecting the appropriate emulsifier and its amount and, optionally, by adjusting one or more process parameters, the amount of aqueous solvent can be increased to greater than about 75% by weight while still maintaining the emulsion in an inverted state, e.g., with oil as the continuous phase and the aqueous solvent as the dispersed phase.

The disclosure also relates to methods for producing a ceramic body, the methods comprising mixing batch materials to form a green ceramic batch mixture, wherein the batch materials comprise at least one inorganic batch component, at least one binder, at least one lubricant, at least one aqueous solvent, and at least one functionalized silicone compound; forming an inverse emulsion in the green ceramic batch mixture, the inverse emulsion comprising the at least one lubricant, the at least one aqueous solvent, and the at least one functionalized silicone compound; and extruding the green ceramic batch mixture to form a green ceramic body.

Further disclosed herein are methods for producing a ceramic body, the methods comprising mixing batch materials to form a green ceramic batch mixture, wherein the batch materials comprise at least one inorganic batch component, at least one binder, at least one lubricant, at least one aqueous solvent, and at least one emulsifier; and forming an inverse emulsion in the green ceramic batch mixture, the inverse emulsion comprising the at least one lubricant, the at least one aqueous solvent, and the at least one emulsifier, wherein the at least one aqueous solvent comprises at least about 75% by weight of the inverse emulsion; and extruding the green ceramic batch mixture to form a green ceramic body.

The batch materials can be mixed using any suitable method known in the art. In various embodiments, the inorganic batch components comprise dry powders, which can be mixed to form a substantially homogeneous dry mixture. For example, the inorganic batch components can be pre-combined to form a substantially dry mixture and can be subsequently wet and/or plasticized by the addition of one or more of the lubricant, solvent, binder, and/or emulsifier. Optionally, the at least one pore former can also be blended with the inorganic batch components to form a dry mixture. According to certain non-limiting embodiments, the lubricant, solvent, and emulsifier can be pre-mixed to form an inverse emulsion that is subsequently combined with the dry materials, e.g., the inorganic batch components and/or pore former. Alternatively, all wet and dry batch materials can be mixed together, in any order or subcombination, to form a green ceramic batch mixture comprising the inverse emulsion, e.g., the inverse emulsion can be formed in situ during mixing. The individual components of the green ceramic batch mixture, regardless of the order of addition, can be mixed to form a substantially homogeneous mixture. By way of non-limiting example, the batch materials can be mixed or kneaded, e.g., using a ribbon mixer, twin-screw extruder/mixer, auger mixer, muller mixer, or double-arm mixer.

The green ceramic batch mixture can then be extruded to form a green ceramic body, such as a self-supporting green ceramic body. In some examples, the structural integrity of the extruded green ceramic body is aided by the presence of binder component (specifically, for example, when an oil-soluble binder is used as the at least one binder) in the green ceramic batch mixture. In some examples, a squeeze-flow test can be conducted whereby the extruded green ceramic body is compressed between two parallel plates and squeezed out radially. Stated generally, the squeeze-flow is a flow in which a material is deformed between two parallel or nearly parallel boundaries approaching each other. Elastic modulus (Eo) can be used as one standard to gauge the strength of the green ceramic body (i.e., the ability to withstand collapse under its own weight). In some examples, the Eo can be in a range between 60 and 200, or at least 60, or at least 70, or at least 80, or at least 90, or at least 100, or at least 110, or at least 120, or at least 130, or at least 140, or at least 150, or at least 160, or at least 170, or at least 180, or at least 190, or at least 200, or any value/range therebetween.

The green ceramic batch mixture can be extruded, e.g., vertically or horizontally, using a hydraulic ram extrusion press, a single auger extruder, or a twin-screw mixer, with a die assembly attached to the discharge end. According to various embodiments, the green ceramic batch mixture can be extruded to form a ceramic green body comprising a honeycomb configuration comprising a plurality of walls forming channels having one or more desired channel shapes, wall thicknesses, and/or cell densities.

As used herein, the term "green body" and variations thereof is intended to denote an unfired and, in some embodiments, an unreacted precursor composition or mixture, which can be extruded and, in various embodiments, can result in a self-standing green body after extrusion, such as is obtained by the mixture being plasticized. The green body can be dried and, in some embodiments, has not undergone calcination, sintering, or any other reactive process. In certain embodiments, the green body can optionally be dried using air drying, hot-air drying, dielectric drying, microwave drying, vacuum drying, or freeze drying. In contrast, a "fired" or "sintered" ceramic body and variations thereof is intended to denote a ceramic body that has undergone firing in conditions effective to convert the batch mixture into a final ceramic composition. The ceramic body can also undergo calcination during the firing process.

The green body is, in some embodiments, fired to form a ceramic body. It is within the ability of those skilled in the art to determine the appropriate methods and parameters for forming the desired ceramic body, such as firing conditions including equipment, temperature, and duration. Such methods and conditions may depend, for example, on the size, geometry, and composition of the green body, as well as the desired properties of the ceramic body. By way of non-limiting example, firing can occur at a temperature ranging from about 1200° C. to about 1600° C., such as from about 1250° C. to about 1500° C., from about 1300° C. to about 1450° C., or from about 1350° C. to about 1400° C., including all ranges and subranges therebetween. Exemplary firing times range from about 1 hour to about 200 hours, such as from about 2 hours to about 100 hours, from about 3 hours to about 50 hours, from about 5 hours to about 25 hours, or from about 10 hours to about 20 hours, including all ranges and subranges therebetween.

Optionally, the green ceramic body can be fired in a two-stage process, comprising a heating stage to burn out organic components such as the pore former, binder, surfactant, oil, and/or emulsifier. For instance, the binder can have a combustion temperature ranging from about 200° C. to about 300° C. and the pore former can have a combustion temperature ranging from about 300° C. to about 1000° C.

During the heating stage, the green ceramic can be exposed to a temperature ranging from about 200° C. to about 1000° C., such as from about 300° C. to about 800° C., from about 400° C. to about 700° C., or from about 500° C. to about 600° C., including all ranges and subranges therebetween.

Ceramic bodies made using the methods and/or batch mixtures disclosed herein can be utilized to form a green ceramic body of a desired shape and/or dimension, including cellular bodies such as honeycomb bodies. For example, the batch mixtures disclosed herein can be extruded or otherwise formed to produce a green ceramic body having any shape, such as a honeycomb-shaped body. For example, a green ceramic body can have a 3-dimensional shape, such as a cube, block, pyramid, cylinder, sphere, or the like, with a width, length, height, and/or diameter. In various embodiments, the green ceramic body can be formed as a monolithic structure, for example, via extruding and/or molding techniques. Those having ordinary skill in the art are familiar with the various techniques for forming such ceramic monolithic structures. The green ceramic body can be subsequently fired to produce a fired ceramic body having the desired shape and composition.

In some embodiments, a sintered ceramic body or fired ceramic body can comprise a porous ceramic structure (or microstructure). A "porous" ceramic as disclosed herein can comprising a ceramic structure having a porosity, in some embodiments, of at least about 40%, such as about 45%, 50%, 55%, 60%, 65%, 70%, 75%, 80%, 85%, or greater. The porous ceramic structure is not limited in shape, size, pore size, pore distribution, and/or pore number. Porous ceramic structures can also have any variety of configurations and designs including, but not limited to, flow-through monolith, wall-flow monolith, or partial-flow monolith structures. Exemplary flow-through monoliths comprise walls forming channels, porous networks, or other passages through which fluid can flow from one end of the structure to the other. Exemplary wall-flow monoliths comprise, for example, walls forming channels or porous networks or other passages which can be open or plugged at opposite ends of the structure, thereby capable of directing fluid flow through the channel walls as it flows from one end of the structure to the other. Exemplary partial-flow monoliths can comprise a combination of a wall-flow monolith with a flow-through monolith, e.g., having some channels or passages open on both ends to permit some of the fluid to flow through the channel with minimal resistance. Segmented structures are also contemplated herein which can comprise two or more honeycomb blocks joined together, wherein each honeycomb block is a separate monolith.

In certain embodiments, the green or fired ceramic body has a honeycomb shape, e.g., comprising a plurality of walls forming parallel channels or cells. The cellular geometry of the honeycomb configuration is often used for filtration due to its high surface area per unit volume, such as for increased deposition of particulate matter. The honeycomb structure can comprise a plurality of interior walls separating and defining the plurality of channels. Additionally, one or more of the channels can comprise plugs, which can be used to direct or increase fluid flow through the interior channel walls. The honeycomb channels can have a substantially quadrilateral or hexagonal cross-section or can have any other suitable geometry, for example, circular, square, triangular, rectangular, or sinusoidal cross-sections, or any combination thereof.

Honeycomb bodies are often described in terms of cells (or channels) per square inch of surface area, as well as interior wall thickness (typically in mils or $10^{-3}$ inches). For example, a honeycomb body comprising 300 cells/in$^2$ and a wall thickness of 0.008 inches would be labeled as a 300/8 honeycomb, and so forth. Exemplary honeycomb bodies can comprise from about 100 to about 500 cells/in$^2$ (15.5-77.5 cells/cm$^2$), such as from about 150 to about 400 cells/in$^2$ (23.25-62 cells/cm$^2$), or from about 200 to about 300 cells/in$^2$ (31-46.5 cells/cm$^2$), including all ranges and subranges therebetween. According to additional embodiments, the interior wall thickness can range from about 0.005 to about 0.02 inches (127-508 microns), such as from about 0.006 to about 0.015 inches (152-381 microns), from about 0.007 to about 0.012 inches (177-305 microns), or from about 0.008 to about 0.01 inches (203-254 microns), e.g., about $5 \times 10^{-3}$, $6 \times 10^{-3}$, $7 \times 10^{-3}$, $8 \times 10^{-3}$, $9 \times 10^{-3}$, $10 \times 10^{-3}$, $12 \times 10^{-3}$, $14 \times 10^{-3}$, $16 \times 10^{-3}$, $18 \times 10^{-3}$, or $20 \times 10^{-3}$ inches, including all ranges and subranges therebetween.

Typical honeycomb lengths and/or diameters can range from one to several inches, such as from about 1 inch to about 12 inches (2.54-30.48 cm), from about 2 inches to about 11 inches (5.08-27.94 cm), from about 3 inches to about 10 inches (7.62-25.4 cm), from about 4 inches to about 9 inches (10.16-22.86 cm), from about 5 inches to about 8 inches (12.7-20.32 cm), or from about 6 inches to about 7 inches (15.24-17.78 cm), including all ranges and subranges therebetween. The total volume of such honeycomb bodies can range, in some embodiments, from about 0.1 L to about 20 L, such as from about 0.5 L to about 18 L, from about 1 L to about 16 L, from about 2 L to about 14 L, from about 3 L to about 12 L, from about 4 L to about 10 L, or from about 5 L to about 8 L, including all ranges and subranges therebetween.

The green and/or sintered ceramic body, in certain embodiments, comprises an outer skin and an interior core. For example, the outer skin can form a porous outer surface of the filter and the interior core can comprise walls defining a porous microstructure (e.g., a plurality of channels). The material forming the outer skin and interior walls can be the same or different and, in some embodiments, the outer skin can have a thickness different than the interior wall thickness. The outer skin, in some embodiments, has a porosity different than that of the interior walls, e.g., can be made of a different material or can be made of the same material with a higher or lower porosity. In various exemplary embodiments, the skin is extruded and/or molded together with the core of the honeycomb. In other exemplary embodiments, the skin is a separate structure wrapped around the outside of the core and fired together with the core to create a ceramic structure.

According to certain non-limiting embodiments, the fired ceramic body can have a median pore size ($d_{50}$) of less than about 30 microns, such as ranging from about 8 microns to about 30 microns, from about 10 microns to about 25 microns, or from about 15 microns to about 20 microns, including all ranges and subranges in between, e.g., about 8, 9, 10, 11, 12, 13, 14, 15, 16, 17, 18, 19, 20, 21, 22, 23, 24, 25, 26, 27, 28, 29, or 30 microns. For instance, the $d_{50}$ value can range from about 12 microns to about 23 microns, such as from about 13 microns to about 22 microns, from about 14 microns to about 21 microns, from about 15 microns to about 20 microns, from about 16 microns to about 19 microns, or from about 17 microns to about 18 microns, including all ranges and subranges therebetween. As used herein, median pore sizes are measured via mercury porosimetry.

Additionally, in some embodiments, it may be desirable to limit the number of larger pores in the ceramic body, e.g., such that pores greater than 30 microns make up less than about 10% of the total porosity ($d_{90}$=30 microns). For example, pores greater than 30 microns can make up less than about 8%, less than about 5%, or less than about 2% of the total porosity. In various embodiments, the $d_{90}$ value can range from about 20 microns to about 50 microns, such as from about 25 microns to about 40 microns, or from about 30 microns to about 35 microns, including all ranges and subranges therebetween. Similarly, according to certain embodiments, it may be desirable to limit the number of smaller pores in the ceramic body, e.g., such that pores less than 5 microns make up less than about 10% of the total porosity ($d_{10}$=5 microns). For example, pores smaller than 5 microns can make up less than about 8%, less than about 5%, or less than about 2% of the total porosity. In various embodiments, the $d_{10}$ value can range from about 3 microns to about 15 microns, such as from about 4 microns to about 14 microns, from about 5 microns to about 12 microns, from about 6 microns to about 11 microns, from about 7 microns to about 10 microns, or from about 8 microns to about 9 microns, including all ranges and subranges therebetween.

It will be appreciated that the various disclosed embodiments may involve particular features, elements or steps that are described in connection with that particular embodiment. It will also be appreciated that a particular feature, element or step, although described in relation to one particular embodiment, may be interchanged or combined with alternate embodiments in various non-illustrated combinations or permutations.

It is also to be understood that, as used herein the terms "the," "a," or "an," mean "at least one," and should not be limited to "only one" unless explicitly indicated to the contrary. Thus, for example, reference to "a channel" includes examples having one such "channel" or two or more such "channels" unless the context clearly indicates otherwise. Similarly, a "plurality" or an "array" is intended to denote two or more, such that an "array of channels" or a "plurality of channels" denotes two or more such channels.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

All numerical values expressed herein are to be interpreted as including "about," whether or not so stated, unless expressly indicated otherwise. It is further understood, however, that each numerical value recited is precisely contemplated as well, regardless of whether it is expressed as "about" that value. Thus, "a dimension less than 100 nm" and "a dimension less than about 100 nm" both include embodiments of "a dimension less than about 100 nm" as well as "a dimension less than 100 nm."

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to a method comprising A+B+C include embodiments where a method consists of A+B+C, and embodiments where a method consists essentially of A+B+C.

It will be apparent to those skilled in the art that various modifications and variations can be made to the present disclosure without departing from the spirit and scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:

1. A green ceramic batch mixture comprising:
   at least one inorganic batch component;
   at least one binder; and
   an inverse emulsion comprising a continuous phase, an aqueous dispersed phase, and at least one emulsifier.

2. The batch mixture of claim 1, wherein the at least one inorganic batch component comprises a cordierite-forming powder.

3. The batch mixture of claim 1, wherein the at least one inorganic batch component comprises at least one source of alumina, silica, magnesia, titania, lanthanum oxide, yttrium oxide, barium oxide, sodium oxide, potassium oxide, lithium oxide, calcium oxide, strontium oxide, iron oxide, boron oxide, phosphorous oxide, calcium carbonate, calcium nitrate, calcium hydroxide, strontium carbonate, strontium nitrate, or strontium hydroxide.

4. The batch mixture of claim 1, wherein the at least one binder comprises at least one water-soluble binder, at least one oil-soluble binder, or combinations thereof.

5. The batch mixture of claim 1, wherein the at least one binder comprises at least one oil-soluble binder.

6. The batch mixture of claim 5, wherein the at least one oil-soluble binder comprises at least one of polyisoprene, poly(vinyl formal), poly(vinyl methyl ether), polybutadiene carboxy terminated, or combinations thereof.

7. The batch mixture of claim 1, wherein the at least one binder is present in the green ceramic batch mixture in a range of 1 wt. % to 10 wt. %, as super addition relative to the total weight of inorganic components in the batch mixture.

8. The batch mixture of claim 1, wherein the at least one binder is disposed in the continuous phase.

9. The batch mixture of claim 1, wherein the at least one binder is configured for stabilizing the aqueous dispersed phase by increasing viscosity of the continuous phase.

10. The batch mixture of claim 9, wherein the aqueous dispersed phase is a plurality of micro-droplets having a diameter below about 10 μm.

11. The batch mixture of claim 1, wherein the continuous phase comprises at least one oil.

12. The batch mixture of claim 11, wherein the at least one oil comprises mineral oil, poly alpha-olefin oil, and combinations thereof.

13. The batch mixture of claim 1, wherein the at least one emulsifier comprises: at least one functionalized silicone compound having at least one functional group chosen from a hydroxyl group, a carboxyl group, hydroxyl-terminated ethylene oxide groups, and combinations thereof.

14. The batch mixture of claim 13, wherein the at least one functionalized silicone compound comprises a functionalized siloxane.

15. The batch mixture of claim 1, wherein the at least one emulsifier is present in the green ceramic batch mixture in a range of 0.1 wt. % to 3 wt. %, as super addition relative to the total weight of inorganic components in the batch mixture.

16. The batch mixture of claim 1, wherein the aqueous dispersed phase is present in the inverse emulsion in an amount ranging from about 75% to about 95% by weight based on the total weight of the inverse emulsion.

17. The batch mixture of claim 1, further comprises at least one of: cordierite, aluminum titanate, silicon carbide, silicon nitride, calcium aluminate, zirconium phosphate, eucryptite, spodumene, mullite, or feldspar.

18. A green ceramic body comprising the batch mixture of claim 1.

* * * * *